US012580402B2

(12) United States Patent
Iwahori et al.

(10) Patent No.: US 12,580,402 B2
(45) Date of Patent: Mar. 17, 2026

(54) CHARGING SYSTEM AND CHARGING METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 18/627,633

(22) Filed: Apr. 5, 2024

(65) Prior Publication Data

US 2024/0356353 A1      Oct. 24, 2024

(30) Foreign Application Priority Data

Apr. 21, 2023     (JP) ................................. 2023-069730

(51) Int. Cl.
  *H02J 7/00*          (2026.01)
  *B60L 53/60*        (2019.01)
  *B62D 65/18*        (2006.01)

(52) U.S. Cl.
  CPC ............ *H02J 7/0047* (2013.01); *B62D 65/18* (2013.01); *B60L 53/60* (2019.02)

(58) Field of Classification Search
  CPC ......... H02J 7/0047; B62D 65/18; B60L 53/60
  See application file for complete search history.

(56) References Cited

U.S. PATENT DOCUMENTS

2017/0320529 A1     11/2017   Nordbruch
2018/0345971 A1*   12/2018   Birnschein ........... B62D 21/152

FOREIGN PATENT DOCUMENTS

JP          2017-538619 A      12/2017

* cited by examiner

*Primary Examiner* — Michael C Zarroli
(74) *Attorney, Agent, or Firm* — Sughrue Mion, PLLC

(57) ABSTRACT

A charging system includes a remote control unit runs the vehicle in the manufacturing process of the factory, the vehicle being capable of running on a track in the factory by remote control, the vehicle including a communication device and a secondary battery for running the vehicle on the track is mounted on the vehicle before running the track; a manufacturing status acquiring unit acquires a manufacturing status in a post-process part that is a destination of the vehicle running from a pre-process part where the secondary battery mounted on the vehicle is charged or a pre-charged secondary battery is mounted; and a charging rate determination unit determines a charging rate at the time of mounting using the acquired manufacturing status in the post-process part, the charging rate at the time of mounting being a charging rate of the battery at the time of mounting the secondary on the vehicle.

4 Claims, 6 Drawing Sheets

VEHICLE

START

S11
ACQUIRE VEHICLE LOCATION INFORMATION USING
DETECTION RESULT FROM EXTERNAL SENSOR

S21
DETERMINE NEXT
TARGET LOCATION

S31
GENERATE RUNNING
CONTROL SIGNAL

S41
CONTROL ACTUATOR USING
RUNNING CONTROL SIGNAL

END

CHARGING SYSTEM AND CHARGING METHOD

CROSS-REFERENCE TO RELATED APPLICATIONS

This application claims priority from Japanese Patent Application No. 2023-069730, filed on Apr. 21, 2023, the disclosure of which is entirely incorporated herein by reference.

BACKGROUND

The present disclosure relates to a charging system and a charging method.

For example, Japanese Patent Application Publication No. 2017-538619 discloses a vehicle running method in which, in a manufacturing system for manufacturing a vehicle, the vehicle is caused to run from the end of an assembly line of the manufacturing system to a parking lot of the manufacturing system by remote control.

In a manufacturing factory or the like that manufactures a vehicle, a running time by remote control of the vehicle may be longer than planned due to a delay in manufacturing or the like. In this case, the electric power of the secondary battery for running which is mounted on the vehicle may be consumed more than planned, and the charge rate (SOC: State of Charge) of the secondary battery may be lower than the target value or the managed value.

SUMMARY

The present disclosure can be realized as the following embodiments.

(1) According to an aspect of the present disclosure, a charging system used in a factory for manufacturing a vehicle is provided. The charging system includes a remote control unit configured to run the vehicle by remote control in the manufacturing process of the factory, wherein the vehicle is capable of running on track in the factory by remote control, wherein the vehicle includes a communication device having a communication function and a secondary battery for running mounted on the vehicle before running the track; a manufacturing status acquiring unit configured to acquire a manufacturing status in a post-process part, the post-process part is destination of the vehicle running the track from a pre-process part where the secondary battery mounted on the vehicle is charged or a charged secondary battery is mounted; and a charging rate determination unit configured to determine a charging rate at the time of mounting using the acquired manufacturing status in the post-process part, wherein the charging rate at the time of mounting is a charging rate of the secondary battery at the time of mounting the secondary battery on the vehicle.

According to the charging system of this aspect, by determining the charging rate at the time of mounting using the manufacturing state in the post-process part of the running destination of the vehicle, even if the manufacturing time of the post-process part deviates from the target manufacturing time, it is possible to adjust the charging rate at the time of mounting according to the deviation of the manufacturing time of the post-process part. Therefore, it is possible to suppress or prevent a problem in which the charging rate at the time of arrival at the post-process part is lower than the target value.

(2) In the charging system according to the above aspect, the charging rate determination unit configured to calculate a running reduction charging rate using the acquired manufacturing status in the post-process part, the running reduction charging rate is a charging rate that decreases due to running of the vehicle until the vehicle arrives at the post-process part and determine the charging rate at the time of mounting using the calculated running reduction charging rate.

According to the charging system of this aspect, even when the running mode of the vehicle is switched in accordance with the deviation of the manufacturing time of the post-process, the charging rate at the time of mounting can be determined by using the reduced charging rate for each running mode of the switched vehicle.

(3) In the charging system of the above aspect, the charging rate determination unit configured to further determine the charging rate at the time of mounting using a predetermined target charging rate as a reference value of a charging rate of the secondary battery when the vehicle arrives at the post-process part.

According to the charging system of this aspect, even when the running mode of the vehicle is switched according to the deviation of the manufacturing time of the post-process part, it is possible to determine a suitable charging rate at the time of mounting for each running mode of the switched vehicle.

(4) In the charging system of the above aspect, the charging rate determination unit configured to determine the charging rate at the time of mounting as equal to or greater than a sum of the calculated running reduced charging rate and the target charging rate.

According to the charging system of this aspect, the charging rate of the secondary battery when the vehicle arrives at the post-process part can be more reliably set to be equal to or higher than the target charging rate.

The present disclosure can be implemented in various forms other than a charging system.

For example, the present disclosure can be implemented in the form of such as a charging method, a remote autonomous driving system, a vehicle, a server, a vehicle manufacturing method, a charging device, a control method of a charging device, a computer program for realizing the control method, a non-transitory recording medium storing the computer program.

BRIEF DESCRIPTION OF THE DRAWINGS

Various embodiments of the disclosure are disclosed in the following detailed description and the accompanying drawings.

DETAILED DESCRIPTION

A. First Embodiment

Figure 1:
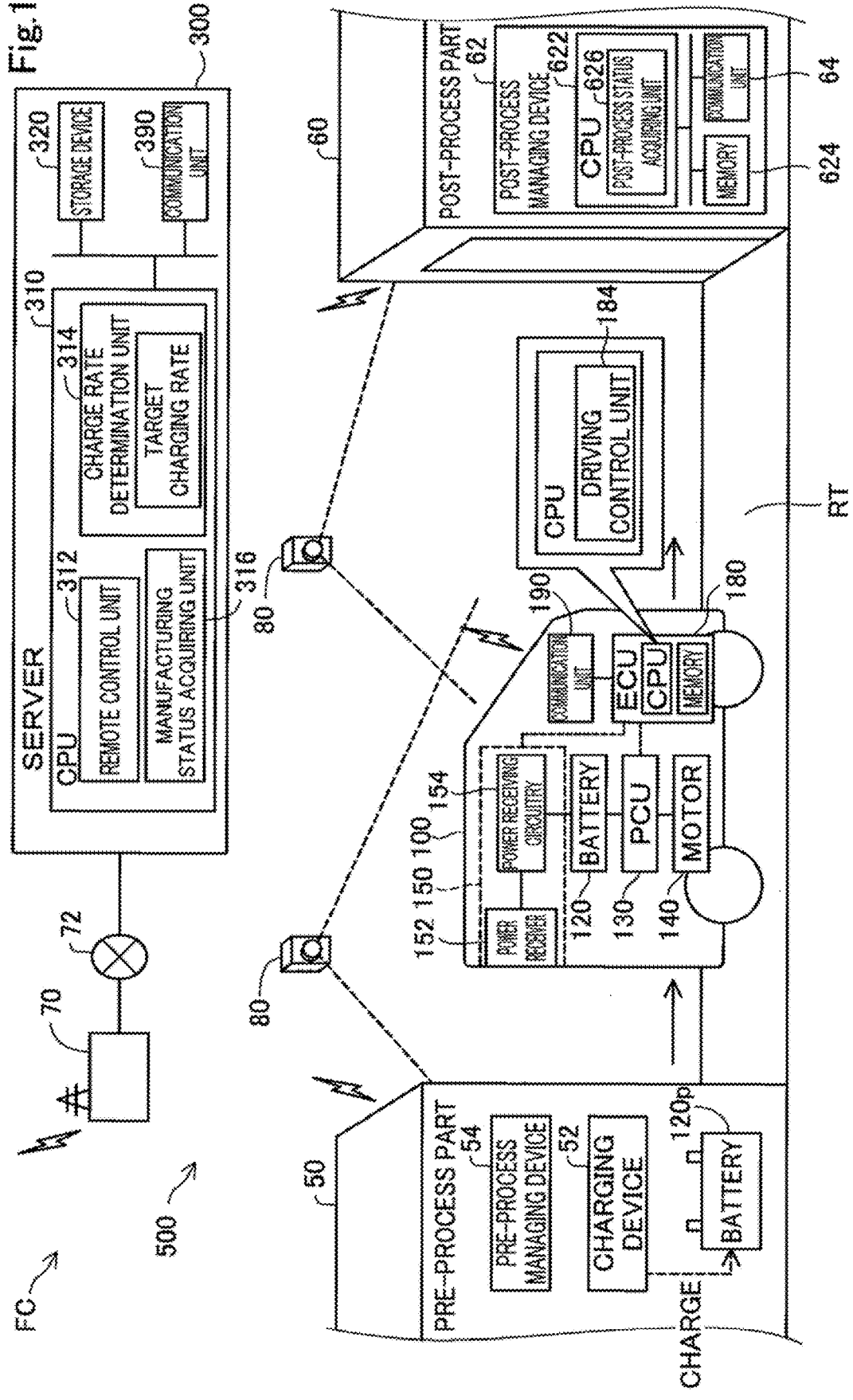
FIG. 1 is an explanatory diagram showing a schematic configuration of a charging system according to a first embodiment.

FIG. 1 is an explanatory diagram showing a schematic configuration of a charging system 500 according to a first embodiment. The charger 500 is used in a factory FC that manufactures vehicles 100. The vehicle 100 is, for example, a passenger car, a truck, a bus, a construction vehicle, or the like. The charger 500 automatically drives the vehicle 100 by remote control, thereby transporting the vehicle 100 in the manufacturing process in the factory FC. The conveyance of the vehicle 100 using the automatic running by the remote control is also referred to as "self-propelled conveyance". The charging device 500 determines a charging rate (SOC: State Of Charge) of a battery 120 mounted on the vehicles 100. Specifically, the charging device 500 determines SOC at the time point when the battery 120 is mounted on the vehicle 100 such that SOC at the time point when the vehicle arrives at the post-process part 60 becomes a predetermined target value. The SOC at the time when the battery 120 is mounted is also referred to as "on-board SOC", and the target of SOC at the time when the vehicle 100 arrives at the post-process part 60 is also referred to as "target SOC".

The vehicle 100 includes a vehicle communication unit 190, a power receiving device 150, a motor 140, the battery 120, a PCU (Power Control Unit) 130, and an ECU (Electronic Control Unit) 180. The vehicle communication unit 190 is a communication device having a communication function of performing radio communication with an external device of the vehicle 100, such as the server 300 connected to the network 72, via the access point 70 in the factory FC. The vehicular communication unit 190 may transmit information such as SOC of the battery 120 to the charger 52, the servers 300, and the like.

The power receiving device 150 includes a power receiver 152 and a power receiving circuit 154. The power receiver 152 is a power supply inlet or the like corresponding to a power supply connector of the charging device 52. The power receiving circuitry 154 is a rectifier, a DC/DC converter, or the like.

The motor 140 is, for example, an AC synchronous motor, and functions as an electric motor and a generator. When the motor 140 functions as an electric motor, the motor 140 is driven using the electric power stored in the battery 120 as a power source. The output of the motor 140 is transmitted to the wheels via the speed reducer and the axle. When the vehicle 100 decelerates, the motor 140 functions as a generator that utilizes the rotation of the wheels and generates regenerative electric power.

The battery 120 is, for example, a rechargeable secondary battery such as a lithium-ion battery or a nickel-metal hydride battery. The battery 120 stores electric power and the like used for running of the vehicle 100. When the electric power supplied from the charging device 52 to the power receiving device 150 and the regenerative electric power generated by the motor 140 are supplied to the battery 120, the battery 120 is charged and SOC of the battery 120 is increased. PCU 130 is electrically connected to the battery 120 and the motor 140. The PCU 130 includes inverters, boost converters, and DC/DC converters.

The ECU 180 is mounted on the vehicle 100 and executes various kinds of control of the vehicle 100. The ECU 180 includes a memory such as a HDD, an optical recording medium, and a semiconductor memory, and a CPU as a central processor. By the CPU executing various computer programs stored in the memories, functions such as the driving control unit 184 that executes the driving control of the vehicles 100 are realized. The "driving control" is, for example, adjustment of acceleration, speed, and steering angle. In the remote control, the ECU 180 controls the respective actuators mounted on the vehicle 100 in accordance with the control signals of the remote control received from the servers 300 via the vehicle communication unit 190.

The plant FC is provided with a pre-process part 50, a post-process part 60, and a track RT of the vehicles 100. The track RT is a conveyance section of the vehicles 100 connecting the pre-process part 50 and the post-process part 60. The plant FC and each step in the manufacturing process may be present over a plurality of locations having differing locations. "Vehicle 100 runs in a factory FC" includes a case where the vehicle 100 runs not only on a private track but also on a public track in order to move between processes in which the vehicle is present in a plurality of locations.

The pre-process part 50 and the post-process part 60 are various processes belonging to the manufacturing process of the vehicle 100. At the post-process part 60, for example, an inspection process of the vehicle 100 is implemented. The vehicle 100 is completed as a product after a process in the post-process part 60, and shipped to the corresponding shipping destination for each vehicle 100. The target SOC varies depending on, for example, a shipping destination. The target SOC is a control item in the inspection process.

At the post-process part 60, a post-process management device 62 for managing the manufacturing information of the vehicle 100 is provided. The post-process managing device 62 includes a CPU 622, memories 624 such as ROM and RAM, and a communication unit 64 for communicating with the servers 300 and the like. When CPU 622 executes the program stored in the memory 624, some or all of the functions of the post-process status acquiring unit 626 and the like are realized.

The post-process status acquiring unit 626 acquires the manufacturing status of the vehicle 100 in the post-process part 60 from the sensor or the like provided in the post-process part 60. "Manufacturing Status" means the deviation of the actual manufacturing time relative to the target manufacturing time. The "target manufacturing time" is a target value of a manufacturing time required for processing of one vehicle 100. The target manufacturing time may be referred to as "tact time." The target manufacturing time may be appropriately adjusted in accordance with the number of targets to be manufactured per day and the manufacturing conditions in the pre-process part and post-process process part. The target manufacturing time is managed for each vehicle type and each vehicle identification information. The "vehicle identification information" means various types of information that can individually identify the vehicle 100. The vehicle identification information includes, for example, ID information given to each vehicle 100 such as VIN (Vehicle Identification Number), and specification information of the vehicle 100 such as a vehicle type, a color, and a shape. The vehicle identification information can be acquired from, for example, a RF-ID (Radio Frequency-Identification) attached to each vehicle 100. The manufacturing status in the post-process part 60 is acquired for each vehicle identification information, and is transmitted to such as the server 300 via the communication unit 64.

In the pre-process part 50, for example, an assembly process of manufacturing a vehicle component such as a battery 120*p* and assembling the manufactured vehicle component to a vehicle body are implemented. The pre-process part 50 includes a charging device 52 and a pre-process management device 54. The pre-process control device 54 acquires the determined on-board SOC from the charge device 500. Other configurations of the pre-process management device 54 are the same as those of the post-process management device 62.

The charger 52 supplies electric power supplied from an external power source to the battery 120*p*. The power supply from the charger 52 to the battery 120*p* is performed, for example, by manual manipulation of an operator in the pre-process part 50. The battery 120*p* is charged so as to be in the acquired on-board SOC, and is mounted on the vehicles 100. The vehicles 100 left from the pre-process part 50 runs the track RT by remote control and runs to the post-process part 60 of the running destination. Charging of the battery 120*p* may be performed automatically by the charging device 52 that acquires the on-board SOC from the charging device 500. Further, by being charged after being mounted on the vehicle 100, it may be adjusted to the mounting time SOC after being mounted on the vehicle 100.

From the viewpoint of production efficiency, it is preferable that the timing at which the vehicle 100 left from the pre-process part 50 arrives at the post-process part 60 coincides with the start timing of the process by the post-process part 60. The arrival timing of the vehicle 100 can be adjusted by switching the running mode of the vehicle 100 in the self-propelled conveyance, such as adjusting the running speed of the vehicle 100 on the track RT. When an abnormality or a delay occurs in the post-process part 60, the running time of the vehicle 100 may be prolonged in order to delay the arrival timing. In this case, the vehicle 100 consume more power of the battery 120 than usual, and there is a possibility that the target SOC cannot be achieved when the on-board SOC is managed at a fixed level.

As illustrated in FIG. 1, the charging system 500 includes a camera 80 as a vehicle detector and a server 300. The vehicle detector detects vehicle information including at least one of images of the vehicle 100 and a position of the vehicle 100. The detected vehicle information is used for remote control by the charging system 500. The "vehicle information" may further include a running direction of the vehicle 100 and an orientation of the vehicle 100. The running direction of the vehicle 100 and the direction of the vehicle 100 may be acquired by, for example, changing the shape and position of the vehicle 100 with time.

The camera 80 is communicably connected to the server 300. The camera 80 acquires an image of the vehicle 100 as the vehicle information. Analysis of the acquired images allows to acquire various vehicle information that can be used for remote control, such as the relative position of the vehicle 100 with respect to the track RT and the orientation of the vehicle 100. Various detectors capable of detecting the position of the vehicle 100 may be used as the vehicle detector, for example, a LiDAR, an infra-red sensor, a laser sensor, an ultrasonic sensor, a millimeter wave radar, and the like.

The server 300 includes a CPU 310 as a central processor, a storage device 320, and a remote communication unit 390. These are connected to each other via an internal bus, an interface circuit, and the like. The remote communication unit 390 is a circuit for communicating with the vehicle 100, the pre-process management device 54, the post-process management device 62, and the like via the network 72.

The storage device 320 is, for example, a hard disk drive (RAM, ROM, HDD), a solid state drive (SSD), or the like. When the computer program stored in the storage device 320 is executed by CPU 310, CPU 310 functions as a remote control unit 312, a charge rate determination unit 314, and a manufacturing status acquiring unit 316. However, some or all of these functions may be configured by a hardware circuit.

The manufacturing status acquiring unit 316 acquires the manufacturing status in the post-process part 60 from the post-process managing device 62 or a production management system or the like that collectively manages the respective processes of the plant FC. The manufacturing status acquiring unit 316 may acquire information capable of estimating a manufacturing status in the post-process part 60, such as a manufacturing status in a process subsequent to the post-process part 60.

The charge rate determination unit 314 determines the mounting time SOC by using the manufacturing state of the post-process part 60 acquired by the manufacturing state acquiring unit 316. In the present embodiment, the charge rate determination unit 314 further calculates the running reduction SOC using the manufacturing state of the post-process part 60. The "running reduction SOC" is a SOC of the amount of electric power consumed by the vehicles 100 running from the front process 50 to the post-process part 60 by the self-propelled conveyance. The running reduction SOC is calculated according to the running modes of the vehicle 100 until reaching the post-process part 60, such as the running time, the running speed, the acceleration, and the deceleration of the vehicle 100.

The charge rate determination unit 314 determines the on-board SOC using the calculated running reduction SOC and the target SOC. More specifically, the charge rate determination unit 314 calculates the sum of the calculated running reduction SOC and the target SOC, and determines the calculation result as the on-board SOC. The mounted SOC may be greater than or equal to the sum. The on-board SOC or the running reduction SOC may be determined using a correspondence map indicating a correspondence with the manufacturing times of the post-process part 60. Note that SOC at the time of mounting, the running reduction SOC, and the target SOC are set so as not to exceed 100%, respectively.

In a case where the manufacturing time of the post-process part 60 is delayed from the planned time, the vehicle 100 running to the post-process part 60 runs for a longer time by an amount delayed from the normal time. In this instance, the running reduction SOC may be increased by a delay. The charge rate determination unit 314 can calculate the running reduction SOC in the running time including the delay of the post-process part 60 by using the manufacturing state of the post-process part 60. Consequently, the mounting time SOC is set higher than the normal time. Further, by increasing the running speed of the vehicle 100, the time delayed in the post-process part 60 may be offset. In this case, the running reduction SOC is calculated according to the running mode of the vehicle 100, so that SOC at the time of mounting is set higher than the reference value by the amount that the running speed is made faster than the normal time.

When the manufacturing state of the post-process part 60 indicates earlier than the target manufacturing time, for example, the running speed of the vehicle 100 may be increased in order to accelerate the arrival time of the vehicle

100 to the post-process part 60. In this case as well, the value is set higher than the reference value by the amount by which the running speed is made faster than in the normal state. However, when the running speed of the vehicle 100 is not changed even if the manufacturing state of the post-process part 60 is earlier than the target manufacturing time, the mounting time SOC may be determined as the reference value.

The remote control unit 312 transmits a control signal requesting remote control of the vehicle 100 to the vehicle 100 via the remote communication unit 390. When the vehicle 100 receives a request for remote control, a driving control is realized by ECU 180, so that the vehicle 100 automatically runs. The remote control unit 312 causes ECU 180 to execute driving control of the vehicle 100 while analyzing images of the vehicle 100 acquired by the cameras 80. The remote control unit 312 causes the vehicle 100 to running along the target route by adjusting the relative position of the vehicle 100 with respect to the target route set in advance in the track RT through the image-analysis.

Figure 2:
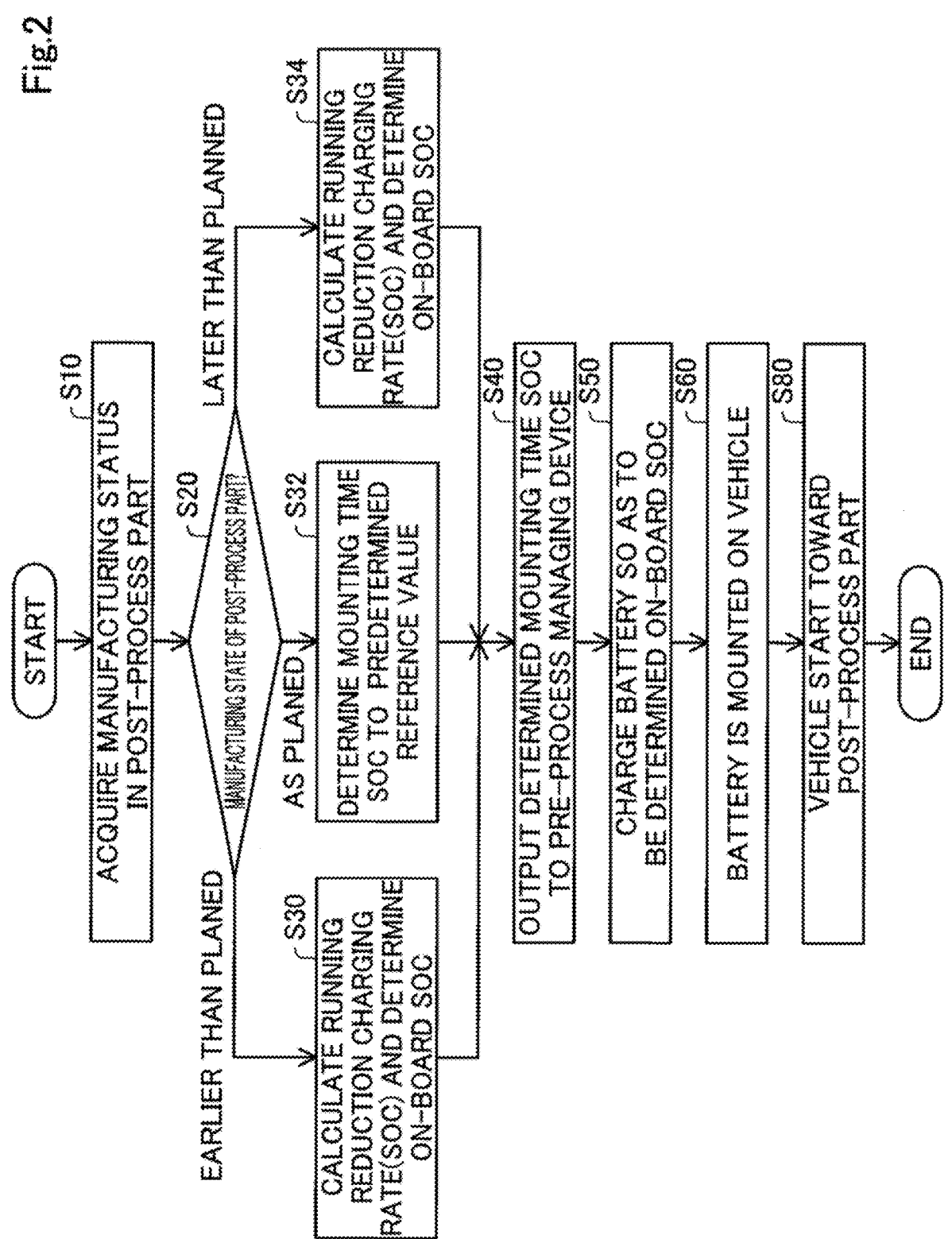
FIG. 2 is a flowchart showing a method of charging a battery in the first embodiment.

FIG. 2 is a flowchart illustrating a charging method of the battery 120 according to the first embodiment. This flow is started, for example, at or before the timing at which the battery 120 is mounted on the vehicle 100.

In step S10, the manufacturing status acquiring unit 316 acquires the manufacturing status in the post-process part 60 from the post-process managing device 62. In step S20, the charge rate determination unit 314 confirms the acquired manufacturing state of the post-process part 60. If the manufacturing state of the post-process part 60 is in accordance with the target manufacturing time (S20: as planned), the charge rate determination unit 314 proceeds to the process to step S32 and determines the mounting time SOC to a predetermined reference value. In this case, the calculation of the running reduction SOC may be omitted. A general error with respect to the target manufacturing time is allowed for "according to the target manufacturing time".

When the manufacturing state of the post-process part 60 is later than the target manufacturing time (S20: later than planned), the charge rate determination unit 314 proceeds to step S34 to calculate the mounting time SOC. More specifically, the charge rate determination unit 314 calculates the running reduction SOC by using the running modes of the vehicles 100 up to the scheduled post-process part 60 and the delay times in the post-process part 60. The charge rate determination unit 314 calculates the sum of the calculated running reduction SOC and the target SOC, and determines the calculation result as an on-board SOC. Consequently, the on-board SOC is determined to be higher than the reference value.

When the manufacturing state of the post-process part 60 is earlier than the target manufacturing time (S20: earlier than planned), the charge rate determination unit 314 proceeds to step S30 and calculates the on-board SOC. More specifically, the charge rate determination unit 314 determines the sum of the running reduction SOC and the target SOC as the on-board SOC. In the present embodiment, in order to accelerate the arrival time of the vehicle 100 to the post-process part 60, the running speed of the vehicle 100 is set to be increased. Therefore, the running reduction SOC is higher than that in the normal state, and the on-board SOC is determined to be higher than the reference value.

In step S40, the charge rate determination unit 314 outputs the determined mounting time SOC to the pre-process managing device 54. In step S50, the operator of the pre-process part 50 completes the charge operation of the battery 120 so as to be in the mounted SOC inputted to the pre-process control device 54. In step S60, the charged battery 120 is mounted on the vehicle 100. In step S70, the remote control unit 312 causes the vehicle 100 to run toward the post-process part 60 by remote control, and ends this flow. The vehicle 100 consumes the calculated amount of power corresponding to the running reduction SOC and reach the post-process part 60, so that SOC of the battery 120 at the time when the vehicle arrives at the post-process part 60 becomes the target SOC.

As described above, the charging system 500 of the present embodiment includes the remote control unit 312 that causes the vehicle 100 to run by remote control, the manufacturing state acquiring unit 316 that acquires the manufacturing state of the post-process part 60, and the charging rate determining unit 314 that determines the mounting time SOC of the battery 120 at the time of mounting on the vehicle 100 by using the acquired manufacturing state of the post-process part 60. By determining the mounting time SOC using the manufacturing state of the post-process part 60, even if the manufacturing time of the post-process part 60 deviates from the target manufacturing time, it is possible to adjust the mounting time SOC according to the deviation of the manufacturing time of the post-process part 60. Therefore, it is possible to suppress or prevent a failure in which SOC at the time of arrival at the post-process part 60 is lower than the target. Further, by adjusting SOC at the time of mounting, shortage of SOC can be suppressed or prevented by a simpler process than the method of adjusting the reduction in SOC by adjusting the running mode of the vehicles 100 after the battery 120 is mounted.

According to the charge system 500 of the present embodiment, the charge rate determination unit 314 calculates the running reduction SOC that is reduced by the running of the vehicle 100 until the vehicle arrives at the post-process part 60 by using the acquired manufacturing state of the post-process part 60, and determines the mounting time SOC by using the calculated running reduction SOC. Therefore, even when the running mode of the vehicle 100 is switched according to the deviation of the manufacturing time of the post-process part 60, the mounting time SOC can be determined by using the running reduction SOC for each running mode of the switched vehicle 100.

According to the charging system 500 of the present embodiment, the charging rate determination unit 314 further determines the on-board SOC by using the target SOC at the time when the vehicle 100 arrives at the post-process part 60. Therefore, even when the running mode of the vehicle 100 is switched according to the manufacturing state of the post-process part 60, it is possible to determine a suitable mounting time SOC for each running mode of the switched vehicle 100.

Charge rate determination section 314 determines the on-board SOC so as to be equal to or greater than the sum of the running reduction SOC and the target SOC. Therefore, SOC of the battery 120 at the time when the vehicles 100 arrive at the post-process part 60 can be more reliably set to be equal to or larger than the target SOC.

B. Secondary Embodiment

Figure 3:
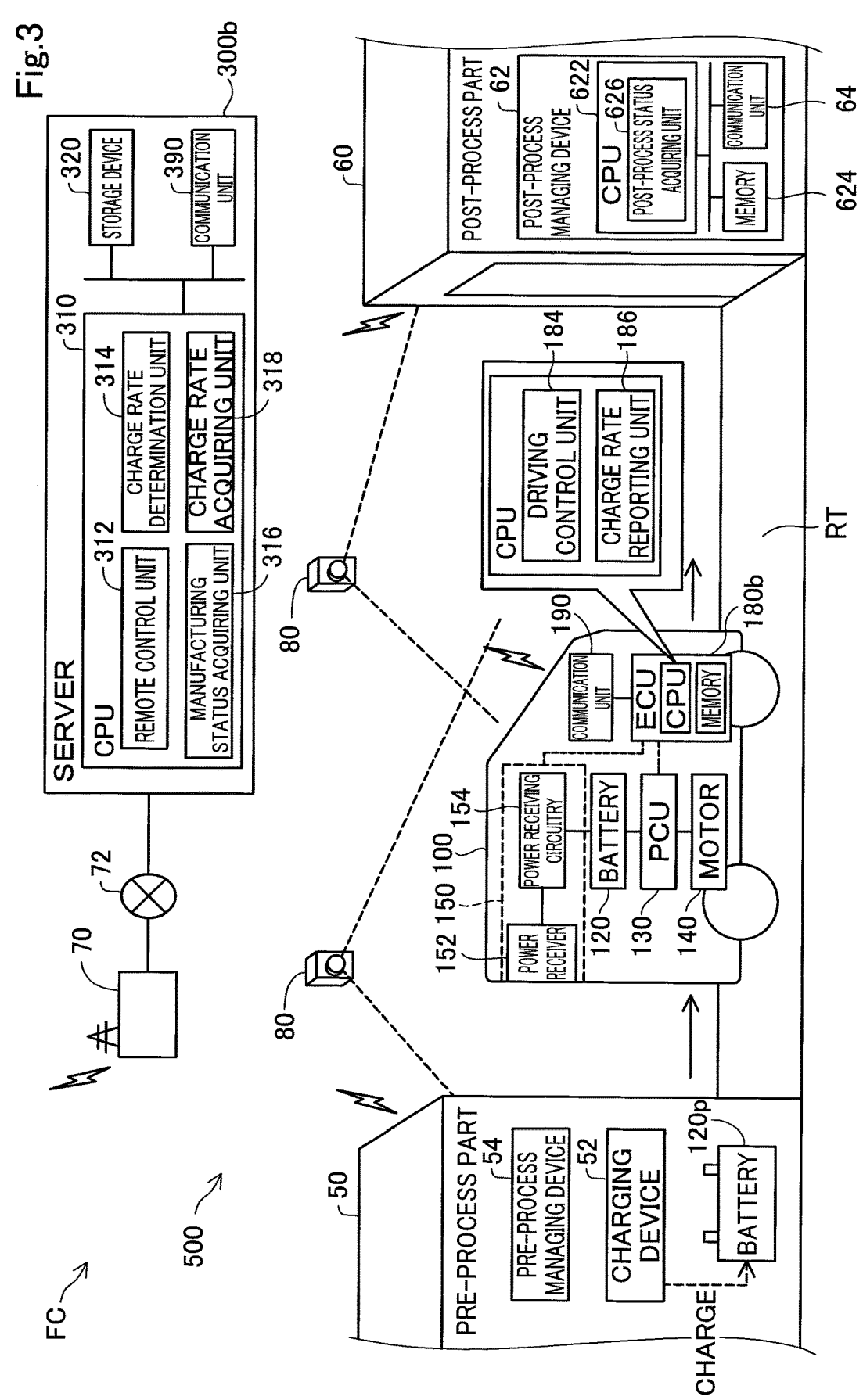
FIG. 3 is an explanatory diagram showing a schematic configuration of a charging system according to a second embodiment.

FIG. 3 is an explanatory diagram illustrating a schematic configuration of a charging system 500 according to the second embodiment. This embodiment differs from the first embodiment in that the charge-system 500 includes a server 300*b* instead of the server 300. CPU 310 of the server 300*b* further functions as the charge rate acquiring unit 318. The charge rate acquiring unit 318 acquires the running reduction SOC transmitted from the vehicle 100.

In the present embodiment, the vehicle 100 includes a ECU 180*b* instead of ECU 180. In ECU 180*b*, CPU further functions as the charge rate reporting unit 186. The charge rate reporting unit 186 calculates the running reduction SOC and reports the calculation result to the server 300*b*. The charge rate reporting unit 186 calculates SOC using, for example, the cell voltage, the current, the temperature, and the like of the battery 120. The charge rate reporting unit 186 calculates the running reduction SOC by using the difference between SOC at the time point of departure from the previous step 50 and SOC at the time point of arrival at the subsequent step 60.

Figure 4:
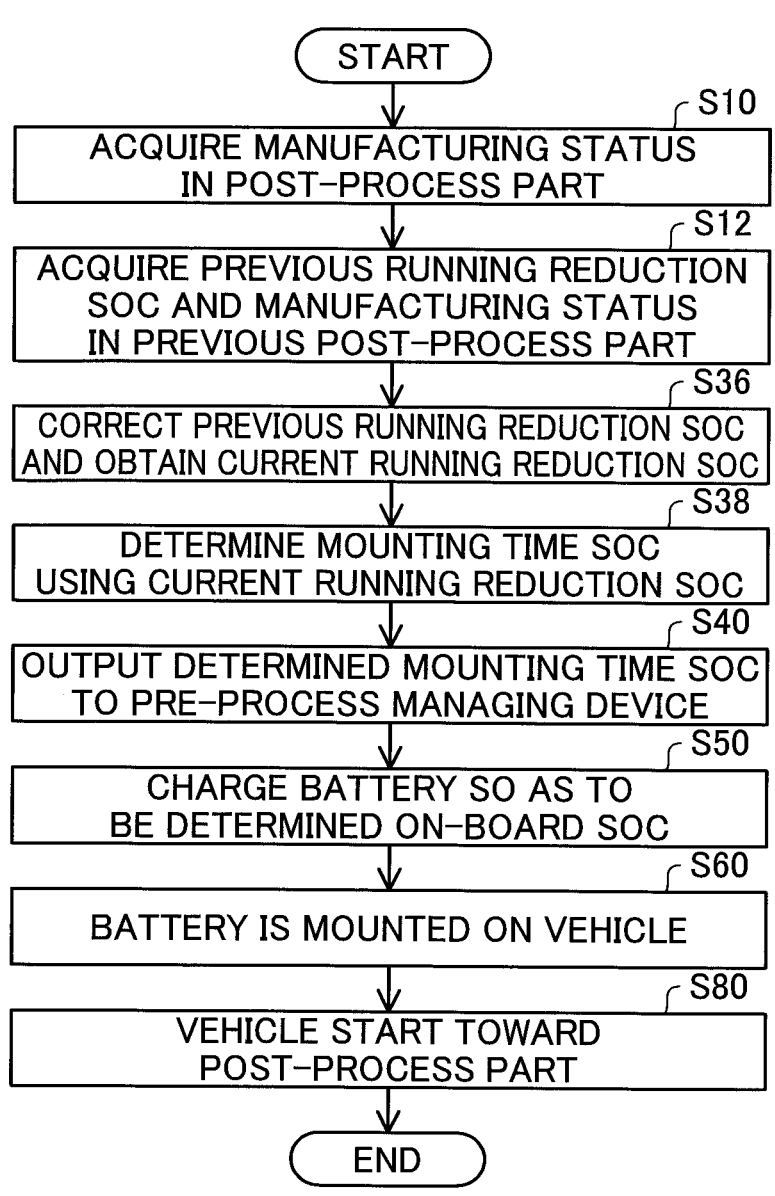
FIG. 4 is a flow chart showing a method of charging a battery in the second embodiment.

FIG. 4 is a flowchart illustrating a charging method of the battery 120 according to the second embodiment. The charge methods of the present embodiment differ from the first embodiment in that step S20 is replaced with step S34 and steps S12, S36, S38 are provided.

In step S12, the charge rate acquiring unit 318 acquires the previous running reduction SOC from the vehicles 100 that have arrived at the previous post-process part 60. Further, the manufacturing status acquiring unit 316 acquires, from the post-process management device 62, the manufacturing status in the post-process part 60 (also referred to as the "manufacturing status in the previous post-process part 60") during the running of the vehicle 100 that has arrived at the post-process part 60 last time. In step S36, the charge rate determination unit 314 corrects the obtained previous running reduction SOC to obtain an estimate of the current running reduction SOC. More specifically, the charge rate determination unit 314 calculates a ratio between the manufacturing state of the previous subsequent process 60 acquired in step S12 and the manufacturing state of the current subsequent process 60 acquired in step S10, and acquires a value obtained by multiplying the acquired previous running reduction SOC by the ratio as the current running reduction SOC. In step S38, the calculated sum of the obtained running reduction SOC and the target SOC is determined as an on-board SOC.

As described above, according to the charge device 500 of the present embodiment, the present running reduction SOC is estimated by feeding back the measured value of the previous running reduction SOC. By calculating the running reduction SOC using the actual measurement of the running reduction SOC, it is possible to obtain the mounting time SOC suitable for the actual running of the vehicles 100. Further, the running reduction SOC can be obtained by a simpler process than when the running reduction SOC is calculated by using the running modes of the vehicles 100 up to the post-process part 60.

C. Other Embodiments (C1) In the above embodiments, the charge rate determination unit 314, the manufacturing status acquiring unit 316, and the charge rate acquiring unit 318 are provided in the server 300,300*b*. On the other hand, all or a part of these functions may be provided in a device other than the server 300,300*b* such as the vehicle 100, the pre-process management device 54, and the post-process management device 62.

(C2) Although the vehicle 100 is used for explanation in each above embodiments a moving object may be used. The "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

(C3) In the above embodiments, the charge rate determination unit 314 calculates the running reduction SOC using the acquired manufacturing conditions of the post-process part 60. The charge rate determination unit 314 may be configured not to calculate the running reduction SOC. In the first embodiment, the charge rate determination unit 314 uses the target SOC at the time when the vehicles 100 arrive at the post-process part 60. The charge rate determination unit 314 may be configured not to use the target SOC. In this case, the charging rate determination unit 314 acquires, for example, the manufacturing time of the post-process part 60 as the manufacturing state of the post-process part 60. The charge rate determination unit 314 can obtain the mounting time SOC by multiplying the reference value of the mounting time SOC by the ratio of the acquired manufacturing time to the target manufacturing time.

(C4) In the above embodiments, the charging system 500 determines the charging rate (SOC) of the battery 120 mounted on the vehicle 100. In contrast, the charging system 500 is not limited only to the charging rate, and may determine the state of charge of the battery 120 by determining information equivalent to the charging rate of the battery 120, such as the amount of electric power stored in the battery 120, the electric capacity, the electric charge, the cell voltage of the battery 120, and the cell current.

Figure 5:
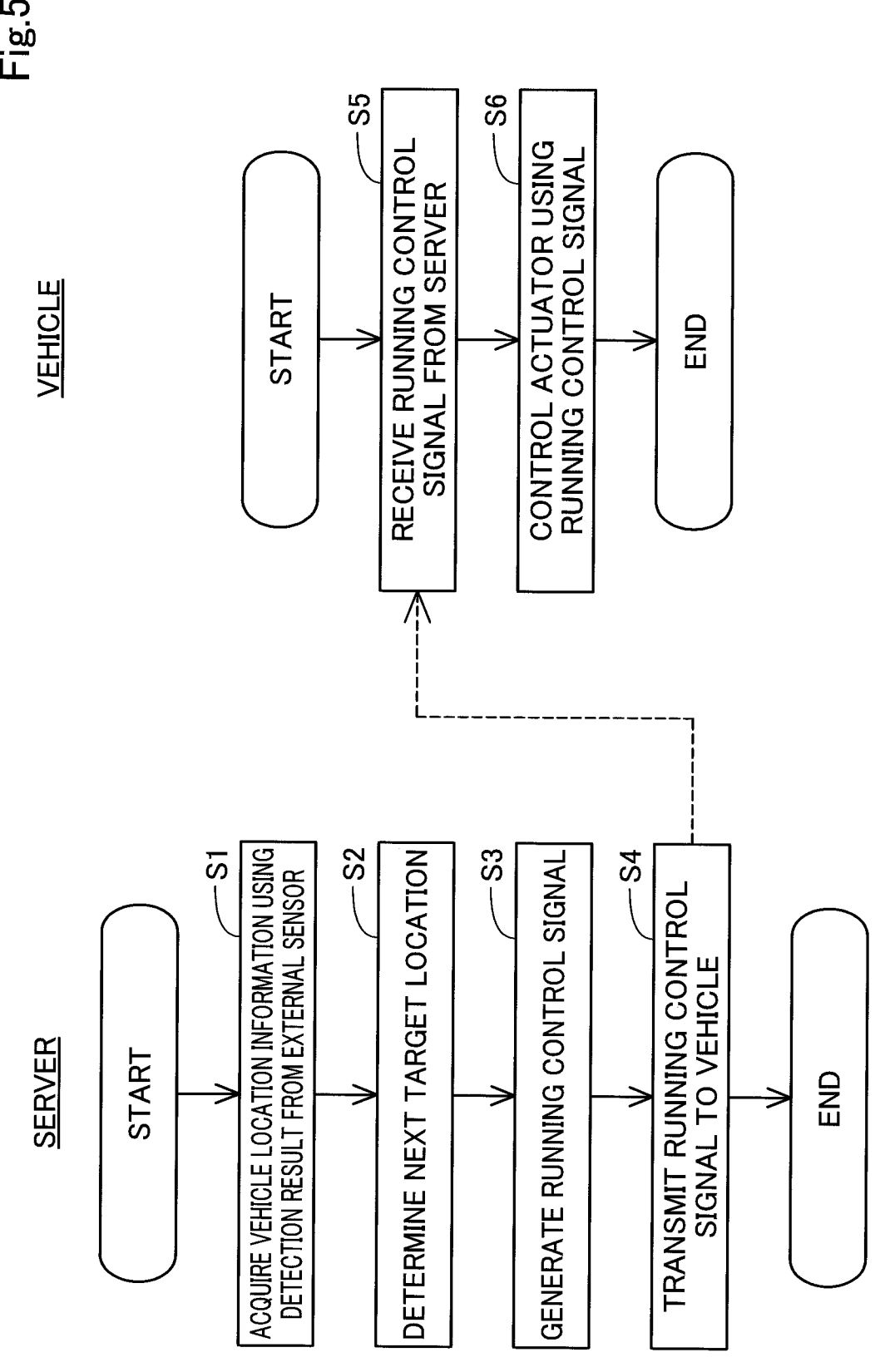
FIG. 5 is a flow chart showing a processing procedure for running control of the vehicle applicable to each embodiment.

(C5) FIG. 5 is a flowchart showing a processing procedure for running control of the vehicle 100 applicable to each embodiment. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1, the server 300 acquires the vehicle location information using the captured image acquired from the camera as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 500 or outside the system 500. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 300 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquiring of vehicle location information, the determination of a target location, the generation of a running control signal, the transmission of the running control signal, and others in a predetermined cycle.

In step S5, the driving controller of the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 500 in the present embodiment, it becomes possible to move the vehicle 100 without using a transport unit such as a crane or a conveyor.

Figure 6:
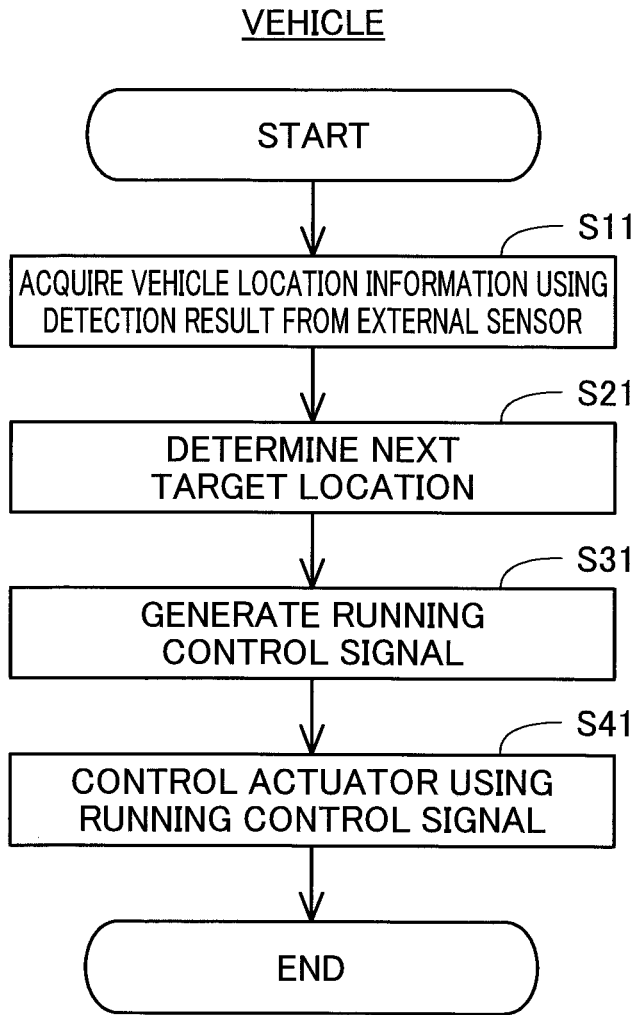
FIG. 6 is another flow chart showing a processing procedure for running control of the vehicle applicable to each embodiment.

(C6) FIG. 6 is a flowchart showing a processing procedure for running control of the vehicle 100 applicable to each embodiment. Since the configuration of the vehicle in the present embodiment is the same as in the first embodiment, the vehicle in the present embodiment is denoted as vehicle 100 for convenience. In step S901, the vehicle 100 acquires vehicle location information using detection result output from the camera as an external sensor. In step S902, the vehicle 100 determines a target location to which the vehicle 100 is to move next. In step S903, the vehicle 100 generates a running control signal for causing the vehicle 100 to run to the determined target location. In step S904, the vehicle 100 controls an actuator using the generated running control signal, thereby causing the vehicle 100 to run by following a parameter indicated by the running control signal. The vehicle 100 repeats the acquiring of vehicle location information, the determination of a target location, the generation of a running control signal, and the control over the actuator in a predetermined cycle. According to the running control in the present embodiment, it is possible to cause the vehicle 100 to run by autonomous control without controlling the vehicle 100 remotely using the server 300.

(C7) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(C8) In the above-described first embodiment, the server 300 performs the processing from acquiring of vehicle location information to generation of a running control signal. By contrast, the vehicle 100 may perform at least part of the processing from acquiring of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C9) In the above-described embodiment in which the vehicle 100 can be running by autonomous control, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(C10) In the above-described embodiment in which the vehicle 100 can be running by autonomous control, the vehicle 100 acquires vehicle location information using detection result from the external sensor. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control an actuator of the vehicle 100 using the generated running control signal. In this case, the vehicle 100 is capable of running without using any detection result from an external sensor. The vehicle 100 may acquire target arrival time or traffic congestion information from outside the vehicle 100 and reflect the target arrival time or traffic congestion information in at least one of the route and the running control signal. The functional configuration of the system 500 may be entirely provided at the vehicle 100. Specifically, the processes realized by the system 500 in the present disclosure may be realized by the vehicle 100 alone.

(C11) In the above-described first embodiment, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(C12) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C13) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C14) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The present disclosure is not limited to the above-described embodiments, and can be realized with various configurations without departing from the spirit thereof. For example, the technical features in the embodiments corresponding to the technical features in the respective embodiments described in the Summary can be appropriately replaced or combined in order to solve some or all of the above-described problems or to achieve some or all of the above-described effects. In addition, if the technical features are not described as essential in the present specification, they can be deleted as appropriate.

What is claimed is:

1. A charging system used in a factory for manufacturing a vehicle comprising:
   a remote control unit configured to run the vehicle by remote control in the manufacturing process of the factory, wherein the vehicle is capable of running on a track in the factory by remote control, wherein the vehicle includes a communication device having a communication function and a secondary battery for running the vehicle, wherein the secondary battery is a rechargeable battery mounted on the vehicle before running the track;
   a manufacturing status acquiring unit configured to acquire a manufacturing status in a post-process part, the post-process part is a destination of the vehicle running on the track from a pre-process part where the secondary battery that is mounted on the vehicle is charged or where a pre-charged secondary battery is mounted on the vehicle; and
   a charging rate determination unit configured to determine a charging rate at the time of mounting using the acquired manufacturing status in the post-process part, wherein the charging rate at the time of mounting is a charging rate of the secondary battery at the time of mounting the secondary battery on the vehicle, wherein the charging rate determination unit is configured to calculate a running reduction charging rate using the acquired manufacturing status in the post-process part, the running reduction charging rate is a charging rate that decreases due to running of the vehicle until the vehicle arrives at the post-process part and wherein the charging rate determination unit is configured to determine the charging rate at the time of mounting using the calculated running reduction charging rate.

2. The charging system according to claim 1, wherein the charging rate determination unit is configured to further determine the charging rate at the time of mounting using a predetermined target charging rate as a reference value of a charging rate of the secondary battery when the vehicle arrives at the post-process part.

3. The charging system according to claim 2, wherein the charging rate determination unit is configured to determine the charging rate at the time of mounting as equal to or greater than a sum of the calculated running reduced charging rate and the target charging rate.

4. A charging method of charging a secondary battery for running a vehicle, the vehicle being capable of running a track in a factory by remote control, and the secondary battery being a rechargeable battery mounted on the vehicle, comprising:
   acquiring a manufacturing state of a post-process part, the post-process part is a destination of the vehicle running on the track from a pre-process part where the secondary battery that is mounted on the vehicle is charged or where a pre-charged secondary battery is mounted on the vehicle; and
   determining a charge rate at the timing of mounting using the acquired manufacturing state in the post-process part, wherein the charging rate at the time of mounting is a charging rate of the secondary battery at the time of mounting the secondary battery on the vehicle, wherein the determining a charge rate at the timing of mounting comprises
calculating a running reduction charging rate using the acquired manufacturing status in the post-process part, the running reduction charging rate being a charging rate that decreases due to running of the vehicle until the vehicle arrives at the post-process part, and determining the charging rate at the time of mounting using the calculated running reduction charging rate.

* * * * *